Dec. 13, 1960 R. L. PANICCI 2,964,099
TENSION MECHANISM FOR WEBBING
Filed June 19, 1958
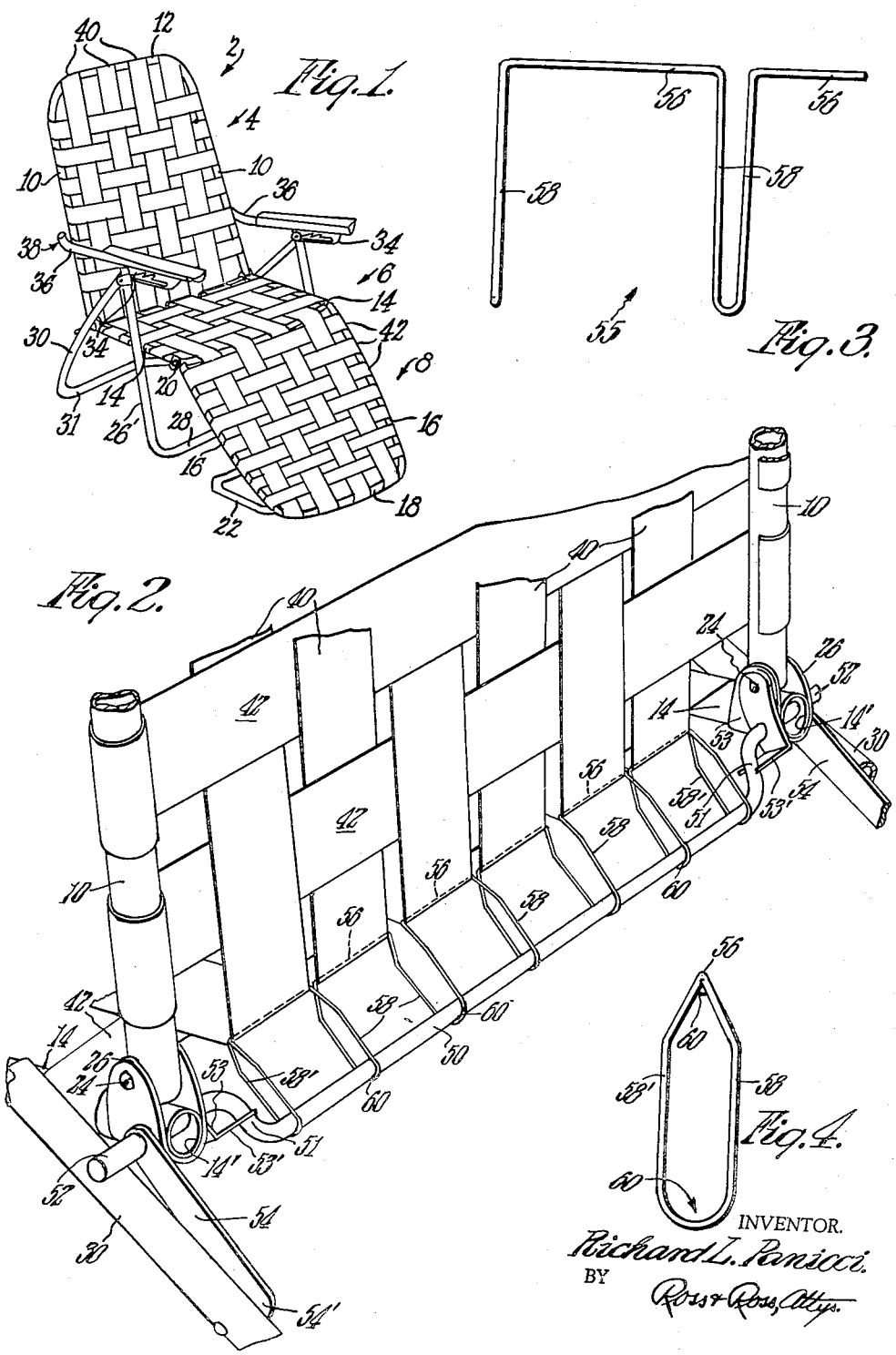
INVENTOR.
Richard L. Panicci.
BY
Ross & Ross, Attys.

United States Patent Office 2,964,099
Patented Dec. 13, 1960

2,964,099

TENSION MECHANISM FOR WEBBING

Richard L. Panicci, Northampton, Mass., assignor to Hampden Specialty Products, Inc., Easthampton, Mass.

Filed June 19, 1958, Ser. No. 743,119

1 Claim. (Cl. 155—187)

This invention relates to improvements in furniture and is directed more particularly to tensioning means for strips of webbing such as are used as supporting means in connection with the frame components of a chaise lounge or the like.

The principal object of the invention is directed to the provision of mechanism for tensioning the parallel strips of the body supporting webbing of an article of furniture having a back-rest frame which is swingable relative to a seat frame.

It is customary for webbing to extend longitudinally of the back-rest or back support and of the seat frame, with the opposite ends thereof being secured to outer ends of said frames with transverse webbing interlaced therewith, and having opposite ends thereof secured to longitudinal side components of the frames.

It is desired and necessary that the webbing be taut for the body supporting function, but same is likely to become objectionably slack inasmuch as the back-rest and seat support frames are relatively swingable, and for other reasons.

According to novel features of the invention, web tensioning mechanism is provided which is adapted to tension and maintain the longitudinal webbing in the desired taut condition for the most efficient supporting function in all positions of the backrest and seat supporting components.

The invention will be hereinafter disclosed in connection with a chaise lounge, but by changes and modifications within the spirit and scope of the invention, it may be employed with various objects having relatively swingable components.

In the drawings:

Fig. 1 is a small scale perspective view of a chaise lounge having the novel features of the invention associated therewith;

Fig. 2 is a perspective view of the rear portion of the lounge shown in Fig. 1, and illustrating the tension mechanism of the invention;

Fig. 3 is a front elevational view of an end portion of the tensioning member of the invention; and Fig. 4 is an end elevational view of the tensioning member shown in Fig. 3.

Referring to the drawings in detail, the novel features of the invention will be described.

As shown in Fig. 1, the chaise lounge 2 has a back-rest 4, a seat 6, and a leg-rest 8, the frames for which are preferably formed from tubing.

The back rest frame is in the form of an inverted U, and has longitudinally extending side members 10, and an upper transverse end member 12, and the seat frame has opposite side members 14. The leg-rest frame has side members 16, and an outer end member 18.

The inner ends of the side members 16 of the leg-rest frame are hinged at 20 to outer ends of the side members 14 of the seat frame for swinging of the leg-rest upwardly to a more horizontal position than shown in Fig. 1. A support 22 is hinged, in suitable manner, to the leg-rest for swinging to a vertical position so as to support the outer end of the leg-rest in a more horizontal position.

Lower ends of the side members 10 of the back-rest frame are swingable on pivots 24 of saddles 26, which are fixed to the rear ends 14' of the side members 14 of the seat frame, as in Fig. 2. The back-rest is swingable from the forward position, shown in Fig. 1, to a more inclined rear position.

A forward leg, having a side portion 26' and a lower portion 28, is provided, as is a rear leg having side portions 30 and a lower portion 31. Upper ends of the side portions 26' and 30 of the forward and rear legs have fixed thereto ratchet plates 34. Side arms 36 have rear ends pivoted at 38 to the side members 10 of the back-rest frame, and are provided with the usual studs or pins to releasably engage notches common in ratchet plates, to releasably hold the back-rest in the desired adjusted positions.

Elongated webbing strips 40 extend longitudinally of the lounge structure, and outer ends thereof are secured to the end members 12 and 18 of the back-rest and leg-rest frames. Elongated webbing 42 is interleaved with the webbing 40 in the usual manner, and extends transversely with opposite ends secured to the longitudinal side members of the frames of the back-rest, seat and leg-rest.

The opposite ends of the webbing may be secured to the members of the frames in any well known manner, such as by screws or the like.

An elongated tension rod 50 of the web tensioning mechanism 55 has opposite end portions 52 offset upwardly therefrom which extend through inner ends 14' of the side members 14 of the seat frame, and through the saddles 26, and secure the saddle and ends 14' against relative movement.

Arms 54 fixed to the tension rod ends 5 have end portions 54' which are suitably secured to side portions 30 of the rear legs. The parts are preferably arranged so that the rod 50 is disposed downwardly and outwardly from the axis of swinging of the side members of the back rest and the saddles 26 in which they are pivoted.

Retainers 53 secured to the saddles by pivots 24 have forked ends 53' which straddle angular portions 51 of the rods 50.

A tension member 55 is formed from a length of wire, which is somewhat resilient, and provided with a series of loops in the form of inverted U's having upper portions 56 and opposite side portions 58. Adjacent side portions 58 of adjacent loops have lower ends connected in more or less semi-circular form to provide lower loops 60.

Upper end and adjacent portions 58 of the loops of the tension member 55 relatively converge to the portions 56 thereof, see Fig. 4, and end portions 58' of the wire forming said member 55 are secured to adjacent portions 58, as by welding 60, or the like.

The longitudinally extending tension rod 50 is disposed within the lower loops 60, and the longitudinal lengths of webbing extend from the seat of the structure underneath the upper straight portions 56 of the loops, and then upwardly in the back-rest portion of the structure.

The web tensioning mechanism is arranged for exerting outward and downward tension to the longitudinal strips of webbing. The side portions 58 of the loops are somewhat relatively yieldable so that each of the webs is acted upon independently, by the horizontal portions 56 of a loop. Thereby each web is independently tensioned. And the mechanism is such that the webs are tensioned in various relative positions of the back-rest and seat.

It will be noted that the member 50 is disposed downwardly and outwardly of the pivotal connections 24, and downwardly and outwardly of the bending lines strips of webbing. It will be desired, for best results, that the portions 56 of the loops be adjacent to or on the horizontal axes of the pivotal connections 24.

Various changes and modifications may be made within the spirit and scope of the invention, and the foregoing is for the purposes of disclosure rather than as limitation of the invention.

I claim:

In an article of manufacture comprising, a substantially horizontally-disposed seat frame, a substantially vertically-disposed back-rest frame, each of said frames being provided with a pair of transversely-spaced longitudinally-extending side members having inner end portions in adjacency and transverse outer end members, saddles disposed between the adjacent inner end portions of the respective side members of said frames for the swinging of said back-rest frame relative to said seat frame between upright and reclined positions, a plurality of spaced parallel longitudinally-extending body supporting strips of resilient webbing having opposite ends secured to the respective outer end members of said frames, a plurality of spaced parallel transversely extending body supporting strips of resilient webbing interlaced with the longitudinally-extending strips of said plurality thereof and having opposite ends secured to the respective side members of said frames, tensioning means for said longitudinally extending strips including transversely extending elongated rod member having opposite end portions connected to the adjacent inner end portions of the side members of said frames and an intermediate elongated portion thereof offset outwardly and downwardly relative to the opposite end portions and an elongated continuous resilient tension member formed to have straight portions engaging upper sides of said longitudinally extending strips and loops alternating with the straight portions and being disposed outwardly and downwardly therefrom, the intermediate portion of said rod member being extended through the loops.

References Cited in the file of this patent

UNITED STATES PATENTS

| 1,234,798 | Pearce | July 31, 1917 |
| 1,572,378 | Breen | Feb. 9, 1926 |
| 2,710,050 | DuBois | June 7, 1955 |
| 2,797,735 | James | July 2, 1957 |